United States Patent
Guler et al.

(10) Patent No.: US 12,437,884 B2
(45) Date of Patent: Oct. 7, 2025

(54) NUCLEAR FUEL ROD HAVING CLADDING WITH VARYING DIAMETER

(71) Applicant: Westinghouse Electric Company LLC, Cranberry Township, PA (US)

(72) Inventors: Cenk Guler, Irwin, PA (US); Yixing Sung, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 17/324,904

(22) Filed: May 19, 2021

(65) Prior Publication Data

US 2022/0375632 A1 Nov. 24, 2022

(51) Int. Cl.
*G21C 3/06* (2006.01)
*G21C 3/17* (2006.01)

(52) U.S. Cl.
CPC .................. *G21C 3/06* (2013.01); *G21C 3/17* (2013.01)

(58) Field of Classification Search
CPC ... G21C 3/04; G21C 3/06; G21C 3/16; G21C 3/17; G21C 3/30; G21C 3/32; G21C 7/04; G21C 3/041; G21C 3/10; G21C 3/18; G21C 3/28; G21C 3/3216
USPC ....... 376/409, 412, 413, 457, 435, 418, 420, 376/423, 445, 451, 455, 456
See application file for complete search history.

(56) References Cited

U.S. PATENT DOCUMENTS

| | | | | |
|---|---|---|---|---|
| 3,031,388 A | * | 4/1962 | Barchet | G21C 3/28 |
| | | | | 376/334 |
| 3,089,830 A | * | 5/1963 | McGeary | B60P 1/60 |
| | | | | 29/445 |
| 3,100,742 A | * | 8/1963 | Winslow | G21C 21/10 |
| | | | | 29/469 |

(Continued)

FOREIGN PATENT DOCUMENTS

| | | | | |
|---|---|---|---|---|
| EP | 0514121 A1 | | 5/1992 | |
| EP | 1149386 B1 | * | 7/2004 | G21C 3/16 |

(Continued)

OTHER PUBLICATIONS

International Search Report and Written Opinion for corresponding International PCT Application No. PCT/US2022/072364, dated Nov. 21, 2022.

(Continued)

*Primary Examiner* — Jinney Kil
(74) *Attorney, Agent, or Firm* — K&L Gates LLP

(57) ABSTRACT

A variable diameter fuel rod of a nuclear reactor assembly is disclosed. The variable diameter fuel rod includes an elongated cladding tube configured to house a plurality of fuel pellets including a fissile material arranged in a fuel stack orientation. The elongated cladding tube includes first and second axial reflector regions and a middle axial region therebetween. The middle axial region comprises an outer diameter defined as $d_1$. The first and second axial reflector regions include an outer cladding diameter defined as $d_2$ and $d_3$, respectively. The variable diameter fuel rod further (Continued)

includes a transitional region between the diameter $d_1$ of the middle axial region and the diameter $d_2$ of the axial reflector region. The diameter $d_2$ of the axial reflector region is greater than the diameter $d_1$ of the middle axial region.

11 Claims, 8 Drawing Sheets

(56) References Cited

U.S. PATENT DOCUMENTS

| | | | | |
|---|---|---|---|---|
| 3,211,627 A * | 10/1965 | Thorp, II | | G21C 3/04 |
| | | | | 376/349 |
| 3,215,606 A | 11/1965 | Silvester | | |
| 3,255,092 A * | 6/1966 | Dee, Jr. | | G21C 7/10 |
| | | | | 976/DIG. 119 |
| 3,291,698 A * | 12/1966 | Fortescne | | G21C 3/041 |
| | | | | 376/418 |
| 3,454,468 A * | 7/1969 | Franco-Ferreira | | G21C 3/33 |
| | | | | 228/159 |
| 3,466,226 A * | 9/1969 | Lass | | G21C 3/17 |
| | | | | 376/418 |
| 3,546,068 A | 12/1970 | Schluderberg | | |
| 3,679,545 A * | 7/1972 | Leirvik | | G21C 3/16 |
| | | | | 376/451 |
| 4,557,892 A * | 12/1985 | Komoda | | G21C 3/17 |
| | | | | 376/412 |
| 5,219,519 A * | 6/1993 | Matzner | | G21C 3/17 |
| | | | | 376/412 |
| 5,377,247 A * | 12/1994 | Yoshioka | | G21C 3/328 |
| | | | | 376/419 |
| 5,416,812 A * | 5/1995 | Matzner | | G21C 3/322 |
| | | | | 376/443 |
| 5,859,886 A * | 1/1999 | Nylund | | G21C 3/17 |
| | | | | 376/418 |
| 6,151,376 A * | 11/2000 | Nylund | | G21C 3/16 |
| | | | | 376/451 |
| 6,301,320 B1 * | 10/2001 | Thomas | | G21C 3/326 |
| | | | | 376/412 |
| 11,315,695 B2 | 4/2022 | Middleburgh et al. | | |
| 2003/0123600 A1 | 7/2003 | Hesketh et al. | | |
| 2008/0181350 A1* | 7/2008 | Hanayama | | G21C 3/326 |
| | | | | 376/212 |
| 2010/0054389 A1* | 3/2010 | Fetterman | | G21C 3/326 |
| | | | | 376/431 |
| 2014/0169516 A1* | 6/2014 | Dunavant | | G21C 3/10 |
| | | | | 376/412 |
| 2014/0192949 A1 | 7/2014 | Feinroth et al. | | |
| 2019/0139654 A1* | 5/2019 | Lahoda | | G21C 7/04 |

FOREIGN PATENT DOCUMENTS

| | | | |
|---|---|---|---|
| FR | 2416529 A1 | | 8/1979 |
| GB | 1093134 | * | 11/1967 |
| JP | H06342090 A | * | 12/1994 |
| JP | 3683975 B2 | | 8/2005 |
| TW | 201841867 A | | 12/2018 |
| WO | 0039807 A1 | | 7/2000 |

OTHER PUBLICATIONS

Search Report for corresponding Taiwan Application No. 111118737, dated Oct. 17, 2023.

* cited by examiner

NUCLEAR FUEL ROD HAVING CLADDING WITH VARYING DIAMETER

BACKGROUND

In a pressurized water reactor (PWR), the reactor core includes a large number of fuel assemblies, each of which is composed of a plurality of elongated fuel elements or rods. The fuel rods each contain fissile material such as uranium dioxide (UO2) or plutonium dioxide (PuO2), or mixtures of these, usually in the form of a stack of nuclear fuel pellets, although annular or particle forms of fuel also are used. The fuel rods are grouped together in an array which is organized to provide a neutron flux in the core sufficient to support a high rate of nuclear fission and thus the release of a large amount of energy in the form of heat. A coolant, such as water, is pumped through the core in order to extract some of the heat generated in the core for the production of useful work. Fuel assemblies vary in size and design depending on the desired size of the core and the size of the reactor.

During the initial operation of the reactor core, a fissile material may produce an excess amount of neutrons during this stage of the fission reaction. The reactivity of the fissile material declines after the initial operation and can result in variable reactivity over the lifetime of the reactor. A more desirable results is a constant reactivity over the lifetime of the reactor. Various methods may be used to counteract or absorb the initial excess reactivity of the fissile material. Typically, control rods are inserted into the reactor cores to absorb the excess neutrons. Additionally, the fuel composition may be tailored for constant reactivity or to attain certain burnup levels. The control rods and fuel compositions use a neutron absorber, known in the art as "burnable poisons" or "burnable absorbers", and may include, boron, gadolinium, cadmium, samarium, erbium and europium compounds.

Burnable poisons absorb the initial excess amount of neutrons while, ideally, producing no new or additional neutrons or changing into new neutron poisons as a result of neutron absorption. During the early stages of operation of such a fuel element, excess neutrons are absorbed by the burnable poison, which preferably undergoes transformation to elements having a low number of neutrons. The fuel pellets may be coated in a thin external layer of zirconium diboride ($ZrB_2$) or a similar material creating an integral fuel burnable absorber (IFBA).

However, the boron in a $ZrB_2$ IFBA coated fuel pellets may react with the fissile material and produce helium gas. The production of gas within the fuel rod can be problematic because the fuel rod is a sealed housing. Thus, the production of gas increases the internal pressure of the fuel rod (known as RIP). The fission reaction itself produces gases that contribute to the increase of the internal pressure of the fuel rod. The internal pressure of the fuel rod must stay under certain levels so that the pressure does not compromise the structural integrity of the fuel rod. This creates a tradeoff between safe operating the fuel rod internal pressure, higher burnup fuel compositions, and IFBA materials to absorb excess neutrons. Therefore the internal pressure of the fuel rod acts as a limiting factor against increasing fuel burnup level, extending fuel lifetime, or maintaining constant reactivity.

SUMMARY

In various aspects, the present disclosure provides a variable diameter fuel rod of a nuclear reactor assembly. The variable diameter fuel rod comprises an elongated cladding tube configured to house a plurality of fuel pellets comprising a fissile material arranged in a fuel stack orientation; the elongated cladding tube comprising first and second axial reflector regions, and a middle axial region therebetween; an outer cladding diameter of the middle axial region defined as $d_1$; and an outer cladding diameter of at least one of the first or second axial reflector regions defined as $d_2$; wherein the diameter $d_2$ of the axial reflector region is greater than the diameter $d_1$ of the middle axial region; and a transitional region between the second diameter $d_1$ of the middle axial region and the larger diameter $d_2$ of the axial reflector region.

In various aspects, the present disclosure provides a fuel rod assembly. The fuel rod assembly comprises a plurality of control rods comprising a plurality burnable absorbers; a plurality of fuel rods comprising an elongated cladding tube housing a plurality of fuel pellets, wherein the fuel pellets comprise a fissile material, and wherein the fuel pellets are arranged in a fuel stack orientation; the plurality of fuel rods comprising: one or more constant diameter fuel rods and one or more variable diameter fuel rods, wherein the variable diameter fuel rods comprise a middle axial region located between an first axial reflector region and a second axial reflector region; the middle axial region has an outer diameter, $d_1$; the first axial reflector region has an outer diameter, $d_2$; the second axial reflector region has an outer diameter, $d_3$, wherein $d_2$ or $d_3$ is greater than $d_1$; and a transitional region between the middle axial reflector region and a larger diameter axial reflector region is defined by a function.

BRIEF DESCRIPTION OF THE DRAWINGS

Various features of the aspects described herein are set forth with particularity in the appended claims. The various aspects, however, both as to organization and methods of operation, together with advantages thereof, may be understood in accordance with the following description taken in conjunction with the accompanying drawings as follows:

Figure 1:
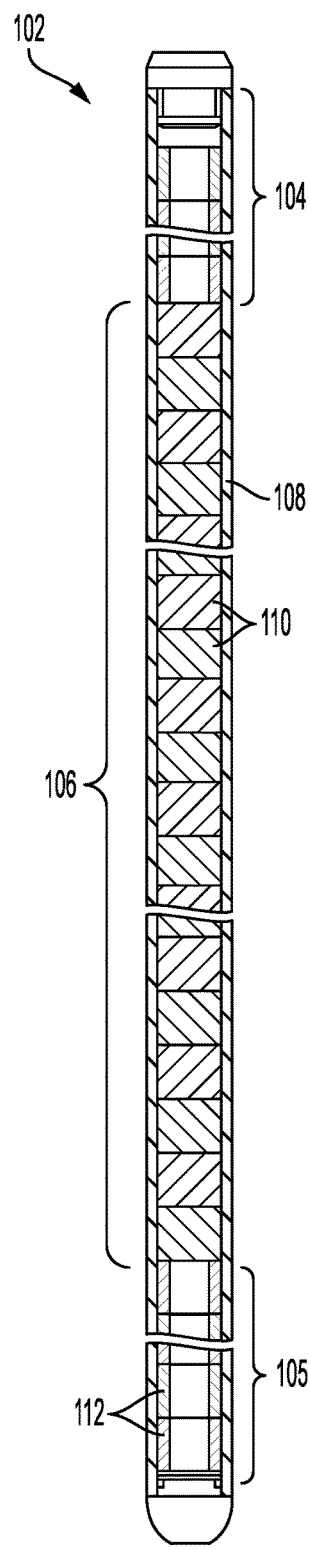
FIG. 1 is a constant diameter fuel rod that comprises a fuel pellet stack in the middle axial region of the fuel rod.

Corresponding reference characters indicate corresponding parts throughout the several views. The examples set out herein illustrate various aspects of the claimed subject matter, in one form, and such examples are not to be construed as limiting the scope of the claimed subject matter in any manner.

DETAILED DESCRIPTION

Before explaining various aspects of a nuclear reactor comprising fuel rods with variable diameters, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples, without limitation.

Limitations associated with the internal pressure of the fuel rod may be resolved by increasing the internal void volume of the fuel rod. In certain aspects, this may result in a decrease in the internal pressure of the fuel rod or may optimize the energy output of the fuel rod. Increasing the internal void volume for a fuel rod provides greater flexibility for designing a reactor core that has a longer fuel lifespan, higher burnup fuel composition, or constant fuel reactivity across the lifespan of the fuel. These advantages may be accomplished by using various fuel compositions that were typically avoided due to the concern that they would produce excess gas and create unsafe levels of internal pressure of the fuel rod.

In various aspects, the overall internal void volume of the fuel rod may be increased by increasing the diameter of the fuel rod cladding in one or both of the axial reflector regions. The diameter of the middle axial region of the fuel rod may remain unchanged, and thus defining a flared configuration at one or both axial reflector regions of the fuel rod. A flared configuration may be employed to exploit the lower burnup and neutron reflector characteristics of the axial reflector regions. Additionally, a variable diameter fuel rod may be employed in a fuel rod assembly with other variable diameter fuel rods or traditional constant diameter fuel rods. In another aspect, a fuel rod assembly comprising constant diameter fuel rods may be retrofitted with variable diameter fuel rods in accordance with the present disclosure.

Figure 2:
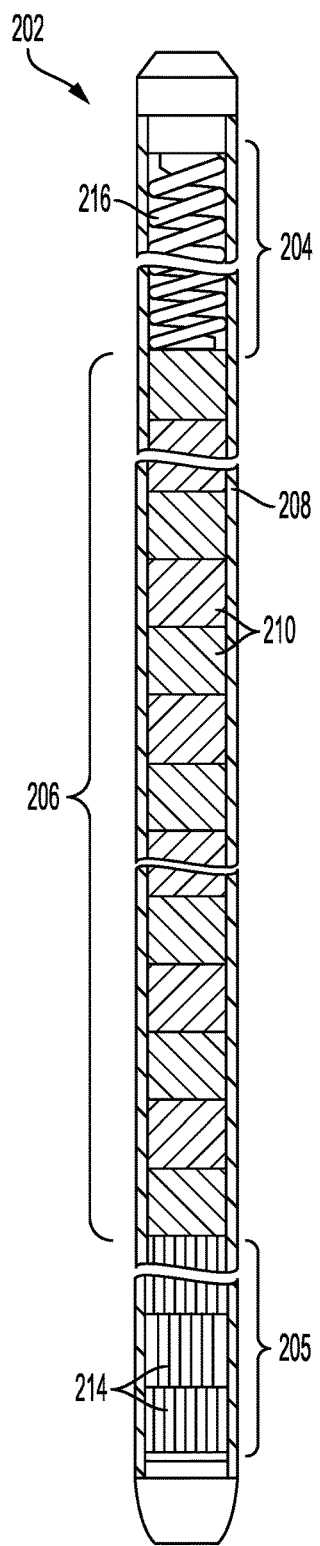
FIG. 2 is a constant diameter fuel rod that employs a spring to bias in place solid fuel pellets in a middle axial region and blanket fuel pellets in axial reflector regions of the fuel rod.

FIGS. 1 and 2 are constant diameter fuel rods 102, 202, that comprise fuel pellet stacks in the middle axial regions 106, 206 respectively. As shown in FIG. 1, the constant diameter fuel rod 102 comprises three axial regions, a first axial reflector region 104, a middle axial region 106, and a second axial reflector region 105. In various aspects, the middle axial region 106 and 206 comprises solid fuel pellets 110 and 210 comprising enriched fissile material to act as a high burnup fuel source. Further, the fuel rods 102, 202 comprise a cladding 108, 208, typically made of a zirconium alloy. As shown in FIG. 1, the first and second axial reflector regions 104, 105 may comprise annular fuel pellets 112. Different types of fuel pellets may be employed in the axial reflector regions 104, 105, 205 to prevent neutron leakage from the middle axial region 106, as described below with reference to FIG. 2.

FIG. 2 is a constant diameter fuel rod 202 employing a spring 216 to bias in place solid fuel pellet stack 210 in a middle axial region 206 and blanket fuel pellets 214 in axial reflector region 205 of the fuel rod 202. As shown in FIG. 2, the constant diameter fuel rod 202 also comprises three axial regions, a first axial reflector region 204, a middle axial region 206, and a second axial region 205. The first axial reflector region 204 comprises a spring 216 to bias the fuel pellet stack in the middle and second regions 206, 205 in place. In contrast to the annular fuel pellets 112 shown in FIG. 1, the constant diameter fuel rod 202 shown in FIG. 2 comprises solid blanket fuel pellets 214. In this aspect, the unoccupied space around the spring would be included in the total volume void calculation. The spring 216 is an optional component and is absent in other aspects in favor of a more simplistic manufacturing process. To compensate for the loss of the spring functionality, more fuel pellets are included within the cladding. The addition of more fuel pellets occupies a greater space and minimizes the amount of movement of the internal components to prevent internal damage. However, the tight placement of internal components also reduces the internal void volume.

FIG. 2 also illustrates the use of solid blanket pellets 214 in the axial reflector region 205 of constant diameter fuel rod 202. The solid blanket pellets 214 occupy a greater internal volume than annular pellets 112, and decrease the internal void volume. Although solid blanket pellets 214 may be used as neutron reflectors, annular pellets 112 may be preferred due to their use of enriched fuel to reflect neutrons and increase to the internal void volume.

Figure 3:
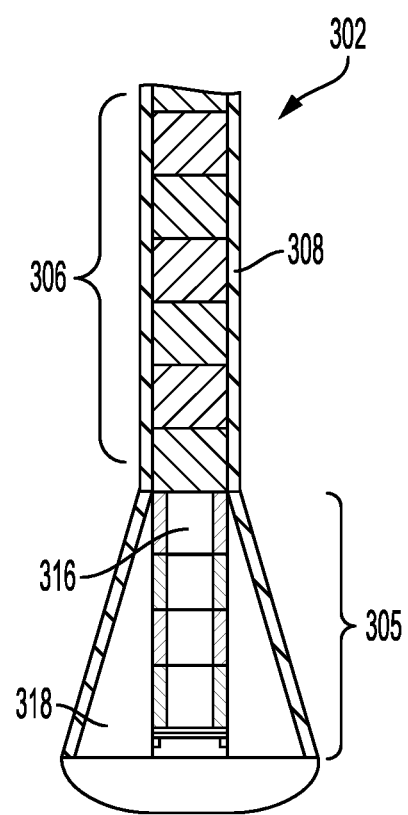
FIG. 3 is a variable diameter fuel rod comprising an axial reflector region having a first cladding diameter and a middle axial region having a second cladding diameter, in accordance with at least one aspect of the present disclosure.

FIG. 3 is a variable diameter fuel rod 302 comprising an axial reflector region 305 having a first diameter, and a middle axial region 306 having a second diameter, in accordance with at least one aspect of the present disclosure. As shown in FIG. 3, the variable diameter fuel rod 302 comprises a larger diameter fuel rod cladding in the axial reflector region 305. The larger diameter cladding 308 increases the internal void volume within the unoccupied space 318 of the axial reflector region 305 of the variable diameter fuel rod 302, in comparison to a constant diameter fuel rods 102, 202 shown in FIGS. 1 and 2.

The total internal void volume within the fuel rod is calculated by taking the summation of all unoccupied space within the sealed fuel rod. The unoccupied spaces within the fuel rod includes the "dish" dimples on either end of fuel pellets, the chamfered edged of fuel pellets, the space between the fuel pellets and the cladding wall, the internal volume of annular fuel pellets 316, and the unoccupied space 318 of the axial reflector regions 304. Depending on the aspect, the variable diameter fuel rod may have a larger diameter cladding in one or both of the axial reflector regions.

Figure 4:
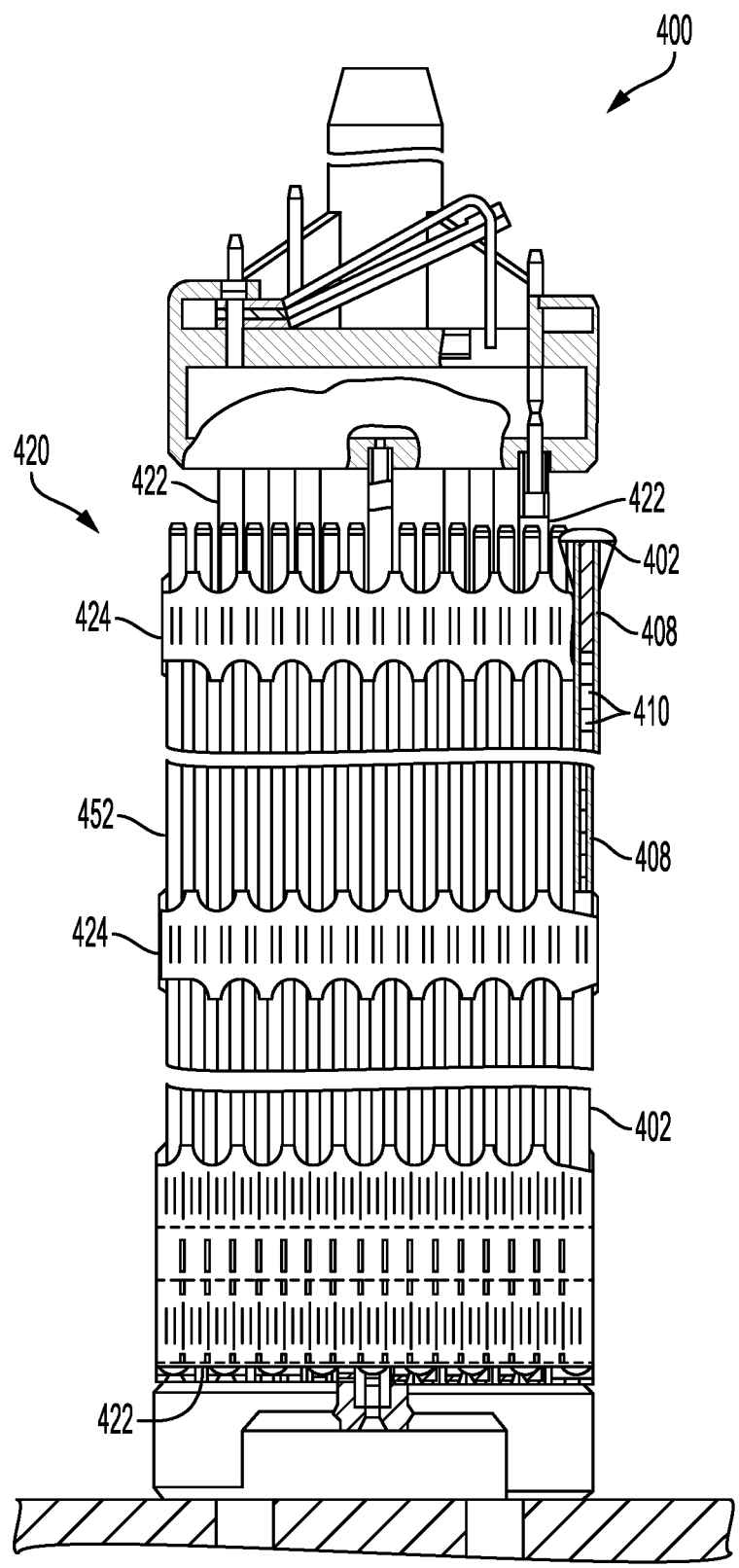
FIG. 4 is a fuel rod assembly comprising constant diameter fuel rods and control rods, in accordance with at least one aspect of the present disclosure.

Turning now to FIG. 4, a plurality of constant diameter fuel rods 452 and one or more variable diameter fuel rods 402 may be grouped into a variable diameter fuel rod bundle 420. The variable diameter fuel rod 402 comprises a cladding 408 and a plurality of fuel pellets 410. The variable diameter fuel rod 402 may be implemented into a fuel rod assembly 400 with the existing components such as the fuel rod grid 424, or may require minor modification to compensate for any dimensional changes. In a preferred aspect, the variable diameter fuel bundle 420 may be retrofitted to support variable diameter fuel rod 402 by considering the pitch of adjacent fuel rods, the diameter of the fuel rod cladding, the location of control rods, and the space needed for coolant to flow within the variable fuel rod bundle.

Figure 5:
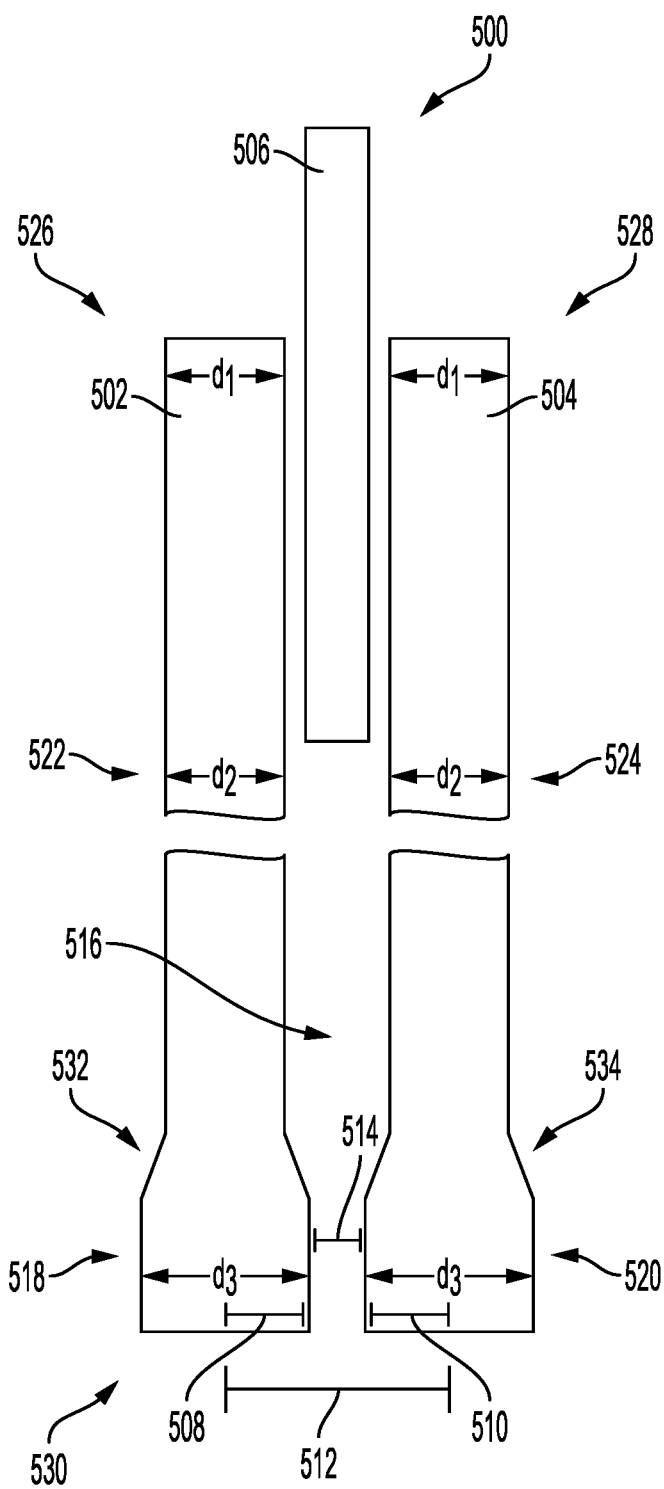
FIG. 5 is a side view of a representative bundle of two adjacent variable diameter fuel rods having a larger diameter on one end to illustrate the spatial relationship between the variable diameter fuel rods and a control rod, and the pitch between adjacent fuel rods, in accordance with at least one aspect of the present disclosure.

FIG. 4 illustrates a fuel rod assembly 400, including control rods 422 that are periodically inserted into the fuel rod bundle at various stages of the reactor operation. The fuel rods 402 in the fuel rod bundle 420 must be arranged in a predetermined configuration that provides a gap for the control rods to be inserted into the fuel rod bundle. A fuel rod grid 424 arranges the fuel rods 402 in a fuel rod bundle 420 in according to a specific spacing and distance between the fuel rods, known as the pitch. FIG. 5 is a side view of a representative bundle 500 of two variable diameter fuel rods 502, 504 having a larger diameter on one end 530 to illustrate the spatial relationship between the variable diameter fuel rods 502, 504 and a control rod 506, and the pitch between the adjacent fuel rods 502, 504, in accordance with at least one aspect of the present disclosure. As shown in FIG. 5, the pitch 512 between two adjacent fuel rods 502, 504 is defined as the center-to-center distance between one fuel rod 502 and an adjacent fuel rod 504. In one aspect, the pitch 512 may be defined as the sum of the radius 508 of fuel rod 502, radius 510 of the adjacent fuel rod 504, and gap 514 defined between the outside surface of the radius of each of the fuel rods 502, 504. Generally, the gap 514 is a value greater than zero such that the fuel rods 502, 504 are not in contact and a space is provided for coolant to flow in the fuel rod bundle 500 in a space 516 defined between the fuel rods 502, 504 and the control rod 506. The pitch between fuel rods is directly related to the maximum diameter of the adjacent fuel rods.

Still with reference to FIG. 5, in one aspect of the present disclosure, the outside cladding diameter $d_3$ of the second axial reflector regions 518, 520 of the fuel rods 502, 504, respectively, is larger than the outside cladding diameter $d_2$ in the middle axial regions 522, 524 and the outside cladding diameter $d_1$ in the first axial reflector regions 526, 528 of the fuel rods 502, 504. In this aspect, the cladding outside diameter $d_1$ of the first axial reflector regions 526, 528 may be limited by the spatial constrains of the cladding outside diameter $d_1$ of the control rod 506 or location of the control rod 506. Control rods 506 are typically only used at the top of the fuel assembly and may allow the second axial reflector regions 518, 520 to support a slightly larger diameter cladding. In this aspect, the second axial reflector regions 518, 520 may have the largest cladding outside diameter, where $d_3 > d_2 \geq d_1$. As shown in FIG. 5, the diameter $d_2$ of the middle axial regions 522, 524 transitions to the larger diameter $d_3$ at transitional regions 532, 534, respectively.

Figure 6:
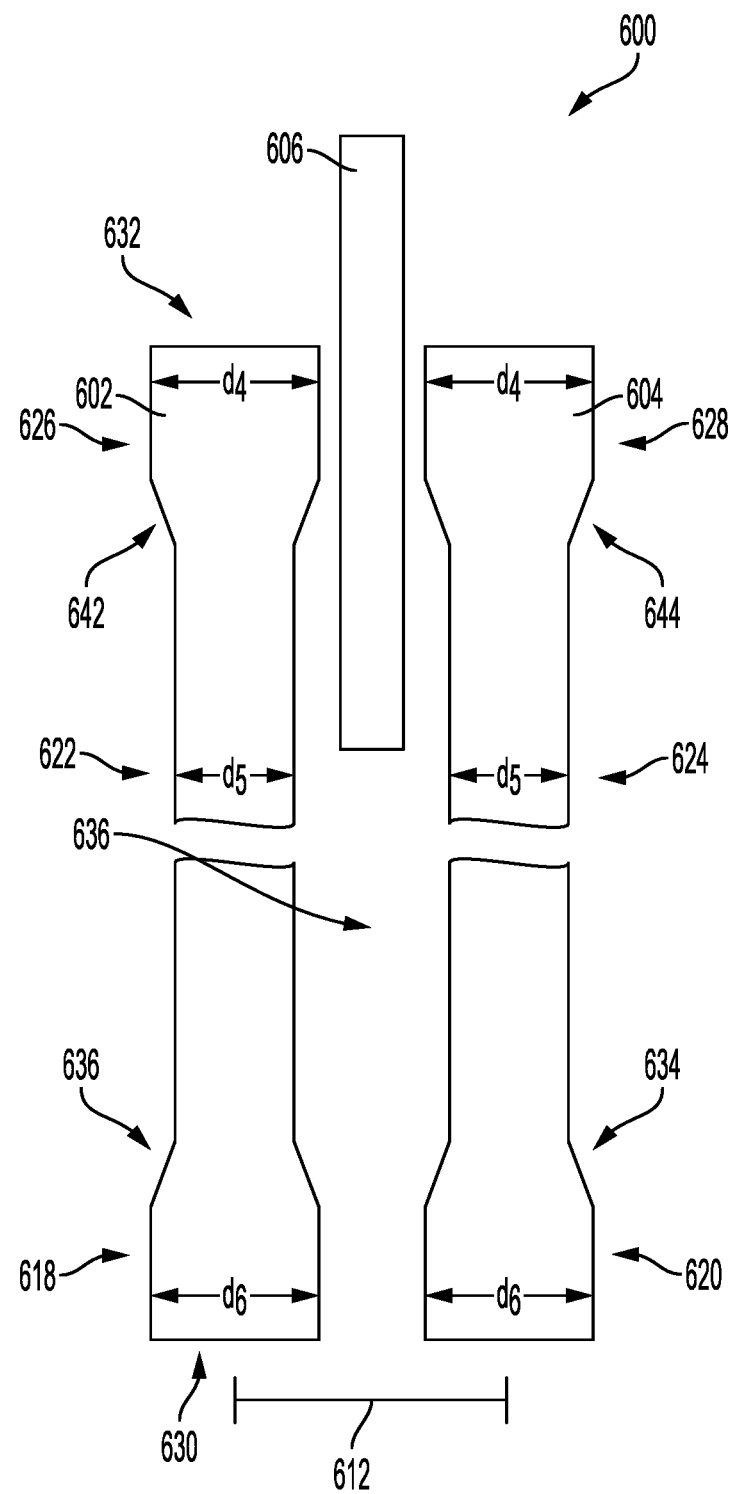
FIG. 6 is a side view of a representative bundle of two adjacent variable diameter fuel rods having a larger diameter on both ends to illustrate the spatial relationship between the variable diameter fuel rods and a control rod, and the pitch between adjacent fuel rods, in accordance with at least one aspect of the present disclosure.

FIG. 6 is a side view of a representative bundle 600 of two adjacent variable diameter fuel rods 602, 604 having a larger diameter on both ends 630, 632 to illustrate the spatial relationship between the variable diameter fuel rods 602, 604 and a control rod 606, and the pitch between adjacent fuel rods, in accordance with at least one aspect of the present disclosure. FIG. 6 illustrates an aspect where there is a sufficient pitch distance 612 between adjacent fuel rods 602, 604 to support a larger diameter cladding for both the first axial reflector regions 626, 628 and the second axial reflector regions 618, 620. Additionally, there is sufficient space in gap 616 for coolant to flow through the fuel rod bundle 600. In this aspect, both the first axial reflector regions 626, 628 and the second axial reflector regions 618, 620 may have the substantially larger cladding diameters than the middle axial region. The outside cladding diameter $d_4$ of the first axial reflector regions 626, 628 of the fuel rods 602, 604, respectively, is larger than the outside cladding diameter $d_5$ in the middle axial reflector regions 622, 624. Further, the outside cladding diameter de of the second axial reflector regions 618, 620 of the fuel rods 602, 604, respectively, is larger than the outside cladding diameter $d_5$ in the middle axial regions 622, 624, where $d_4 > d_5$ and $d_6 > d_5$.

As further shown in FIG. 6, the diameter $d_5$ of the middle axial regions 622, 624 transitions to the larger diameter $d_4$ of the first axial reflector regions 626, 628 at transitional regions 642, 644, respectively. Further, the diameter $d_5$ of the middle axial regions 622, 624 transitions to the larger diameter de of the second axial reflector regions 618, 620 at transitional regions 636, 634, respectively.

Variable diameter fuel rod 502 may provide cost saving advantages over fuel rod 602. Increasing the cladding diameter in only one axial reflector region may minimize the number of associated components that require modifications. Although variable diameter fuel rod 602 has a greater internal void volume than fuel rod 502, the implementation may be based on a number of design factors.

Figure 7B:
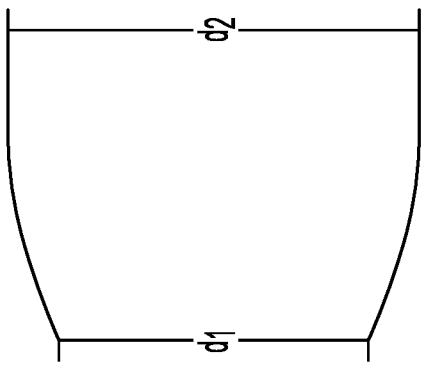
FIG. 7A-7D are profile views of the fuel rod cladding and transitional slopes between the middle axial region and an axial reflector region, in accordance with at least one aspect of the present disclosure.
Figure 7D:
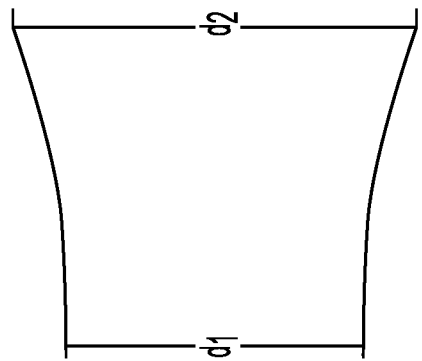
Figure 7A:
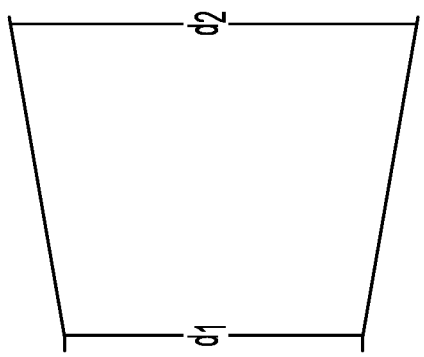
Figure 7C:
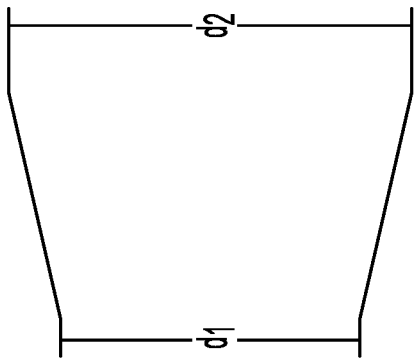

The shape of the transitional region may also be dictated by a number of factors. The shape of the transitional slope between two different diameter sections may be determined according to manufacturing costs, structural integrity related to the manufacturing process, and sufficient space to accommodate coolant and control rods. FIG. 7A-7D illustrate a profile view of the fuel rod cladding and highlight a transitional slope between a larger axial reflector region. FIGS. 7A and 7C illustrate transitional slopes that are defined by a linear function, whereas the transitional slope in FIGS. 7B and 7D are defined by exponential functions. The specific slope may also be determined based on a maximization of the void volume.

Figure 8B:
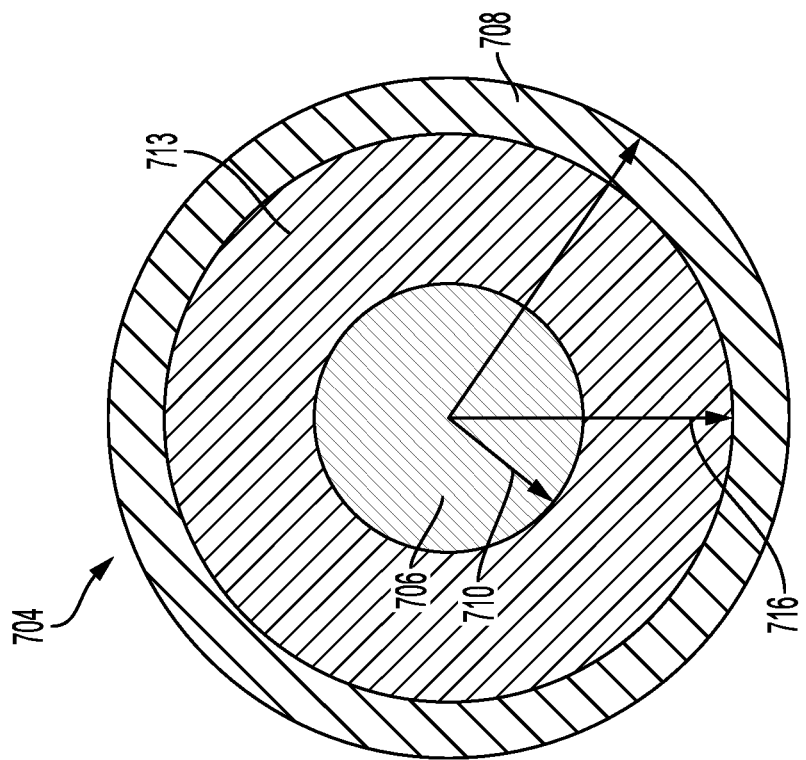
FIG. 8B is a cross-sectional view of an axial reflector region of a variable diameter fuel rod, in accordance with at least one aspect of the present disclosure.
Figure 8A:
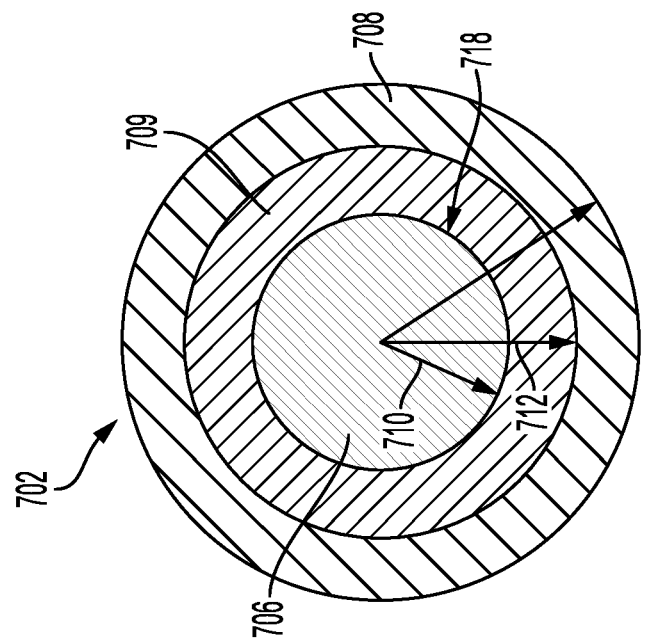
FIG. 8A is a cross-sectional view of the middle axial region of a variable diameter fuel rod, in accordance with at least one aspect of the present disclosure.

FIG. 8A illustrates a cross-sectional view of the middle axial region 702 of a variable diameter fuel rod. The unoccupied space 709 between the fuel pellet 706 and the fuel rod cladding 708 is determined by the difference between radius 710 and the radius 712. FIG. 8B illustrates a cross-sectional view of an axial reflector region 704 of a variable diameter fuel rod. The unoccupied space 713 between the fuel pellet 706 and the fuel rod cladding 708 is determined by the difference between radius 710 and the radius 716. The difference between the unoccupied space 709 and 713 represents an increase in the void volume of the fuel rod. In a preferred aspect, the width of the fuel rod cladding in the middle axial region 702 is the same as the width in the axial reflector region 704.

Figure 9:
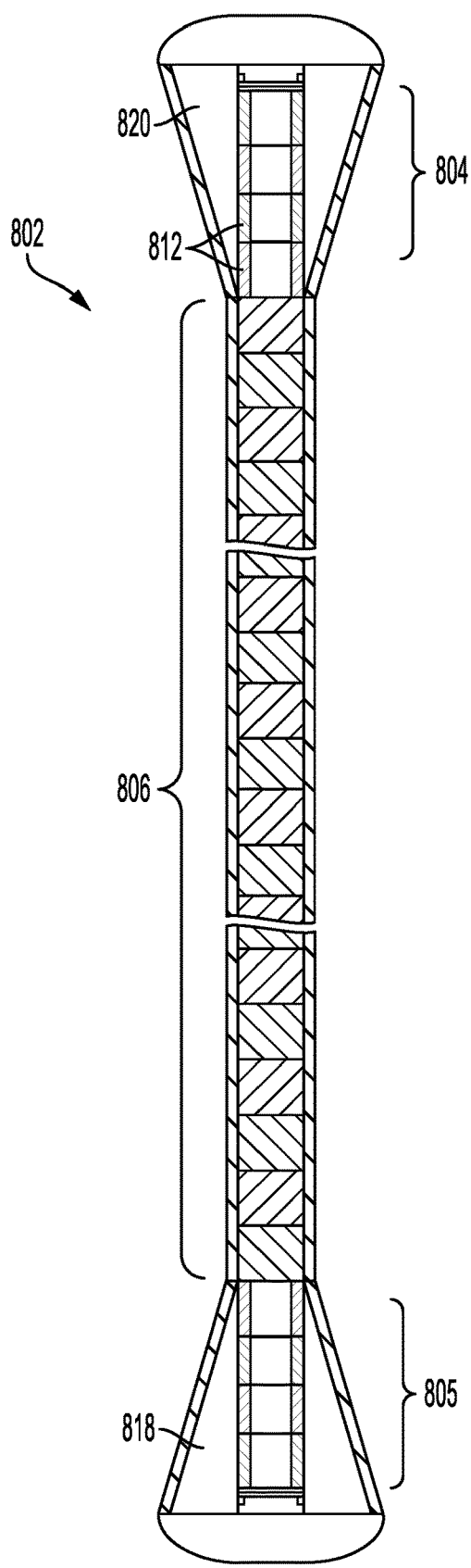
FIG. 9 is a variable diameter fuel rod comprising a first cladding diameter in the first axial reflector region, a second cladding diameter in the middle axial region, and a third cladding diameter in the second axial reflector regions, in accordance with at least one aspect of the present disclosure.
Figure 10:
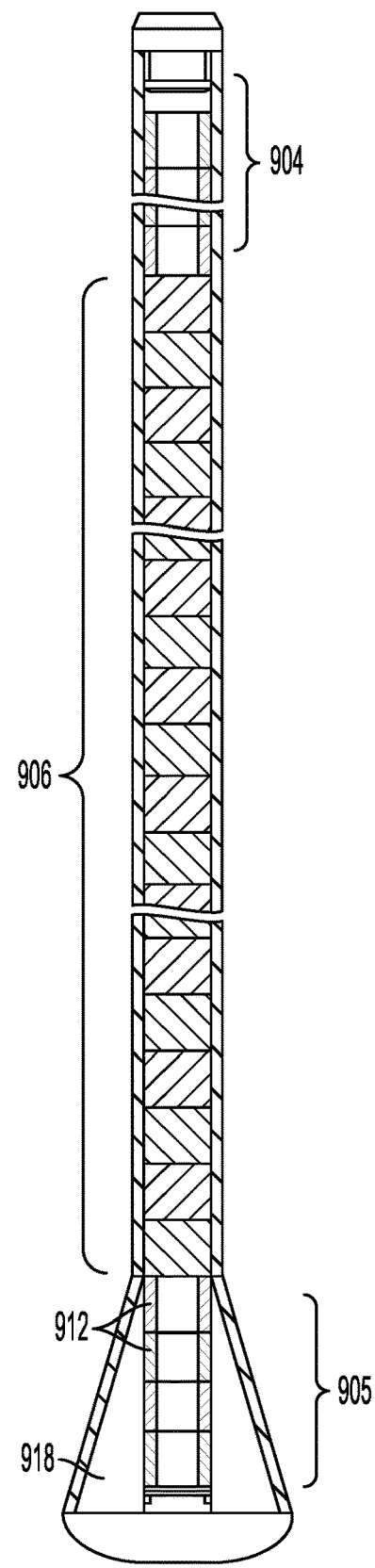
FIG. 10 is a variable diameter fuel rod comprising a first cladding diameter in the first axial reflector region and the middle axial region, and a second cladding diameter in the second axial reflector region, in accordance with at least one aspect of the present disclosure.

FIGS. 9 and 10 illustrate aspects that to maximize the internal void volume. FIG. 9 is a variable diameter fuel rod 802 comprising a first cladding diameter in the first axial reflector region 804, a second cladding diameter in the middle axial region 806, and a third cladding diameter in the second axial reflector regions 805. FIG. 9 illustrates an aspect that employs annular fuel pellets 812 in the axial reflector regions 804, 805 as well as a larger diameter cladding in both the first and second axial reflector regions 804, 805 resulting in an increased void volume 818, 820.

FIG. 10 is a variable diameter fuel rod comprising a first cladding diameter in the first axial reflector region 904 and the middle axial region 906, and a second cladding diameter in the second axial reflector region 905. While FIG. 10 also employs annular fuel pellets 912 in the axial reflector regions 904, 905, only the second axial reflector region 905 comprises a larger diameter cladding. Thus, the increase in cladding diameter only increases the void volume 918 in the second axial reflector region.

Various aspects of the subject matter described herein are set out in the following numbered examples:

Example 1: A variable diameter fuel rod of a nuclear reactor assembly, the variable diameter fuel rod comprising: an elongated cladding tube configured to house a plurality of fuel pellets comprising a fissile material arranged in a fuel stack orientation; the elongated cladding tube comprising first and second axial reflector regions, and a middle axial region therebetween; an outer cladding diameter of the middle axial region defined as $d_1$; and an outer cladding diameter of at least one of the first or second axial reflector regions defined as $d_2$; wherein the diameter $d_2$ of the axial reflector region is greater than the diameter $d_1$ of the middle axial region; and a transitional region between the second diameter $d_1$ of the middle axial region and the larger diameter $d_2$ of the axial reflector region.

Example 2: The variable diameter fuel rod of Example 1, wherein the elongated cladding comprises a zirconium alloy.

Example 3: The variable diameter fuel rod of any one or more of Examples 1-2, wherein the outer cladding diameter of the first axial reflector region is defined as $d_2$ and the outer cladding diameter of the second axial reflector region is defined $d_3$, wherein each one of the diameters $d_2$ and $d_3$ of the first and second axial reflector regions is greater than the diameter $d_1$ of the middle axial region.

Example 4: The variable diameter fuel rod of any one or more of Examples 1-3, wherein an interior cladding diameter of the middle axial region is defined as $di_1$; an interior cladding diameter of the first axial reflector region is defined as $di_2$; an interior cladding diameter of the second axial reflector region is defined as $di_3$, wherein $di_2$ or $di_3$ is greater than $di_1$, and wherein $d_1-di_1=d_2-di_2=d_3-di_3$.

Example 5: The variable diameter fuel rod of any one or more of Examples 1-4, wherein the outer cladding diameter of the first axial reflector region $d_2$ is equal to the outer cladding diameter of the second axial reflector region defined as $d_3$.

Example 6: The variable diameter fuel rod of any one or more of Examples 1-5, wherein the outer cladding diameter of the first axial reflector region $d_2$ is greater than the outer cladding diameter of the second axial reflector region defined as $d_3$.

Example 7: The variable diameter fuel rod of any one of Examples 1-6, wherein the transitional region between the middle reflector region and the axial reflector region is defined by a linear function.

Example 8: The variable diameter fuel rod of any one or more of Examples 1-6, wherein the transitional region between the middle reflector region and the axial reflector region is defined by an exponential function.

Example 9: The variable diameter fuel rod of any one or more of Examples 1-8, wherein the outer diameter of first axial reflector region, $d_2$, and the outer diameter of the second axial reflector region, $d_3$, are greater than the outer diameter of the middle axial region, $d_1$.

Example 10: A fuel rod assembly comprising: a plurality of control rods comprising a plurality burnable absorbers; a plurality of fuel rods comprising an elongated cladding tube housing a plurality of fuel pellets, wherein the fuel pellets comprise a fissile material, and wherein the fuel pellets are arranged in a fuel stack orientation; the plurality of fuel rods comprising: one or more constant diameter fuel rods and one or more variable diameter fuel rods, wherein the variable diameter fuel rods comprise a middle axial region located between an first axial reflector region and a second axial reflector region; the middle axial region has an outer diameter, $d_1$; the first axial reflector region has an outer diameter, $d_2$; the second axial reflector region has an outer diameter, $d_3$, wherein $d_2$ or $d_3$ is greater than $d_1$; and a transitional region between the middle axial reflector region and a larger diameter axial reflector region is defined by a function.

Example 11: The fuel rod assembly of Example 10, wherein an interior cladding diameter of the middle axial region is defined as $di_1$; an interior cladding diameter of the first axial reflector region is defined as $di_2$; an interior cladding diameter of the second axial reflector region is defined as $di_3$, wherein $di_2$ or $di_3$ is greater than $di_1$, and wherein $d_1-di_1=d_2-di_2=d_3-di_3$.

Example 12: The fuel rod assembly of any one or more of Examples 10-11, wherein the fuel pellets in the first axial reflector region and the second axial reflector region comprise annular fuel pellets.

Example 13: The fuel rod assembly of any one or more of Examples 10-12, wherein a plurality of the fuel rod assemblies comprise a nuclear reactor core for a pressurized water reactor (PWR).

Example 14: The fuel rod assembly of any one or more of Examples 10-13, wherein the fuel pellets in the middle axial region are coated with an external integral fuel burnable absorber (IFBA) layer 718 (FIG. 8A).

Example 15: The fuel rod assembly of Example 14, wherein the IFBA coating layer of the fuel pellets comprises an external material of zirconium diboride (ZrB2).

Example 16: The fuel rod assembly of any one or more of Examples 10-15, wherein the function defining the transitional region between the middle reflector region and the first and second reflector region is a linear function.

Example 17: The fuel rod assembly of any one or more of Examples 10-16, wherein the function defining the transitional region between the middle reflector region and the first and second reflector region is an exponential function.

Numerous specific details are set forth to provide a thorough understanding of the overall structure, function, manufacture, and use of the aspects as described in the present disclosure and illustrated in the accompanying drawings. Well-known operations, components, and elements have not been described in detail so as not to obscure the aspects described in the present disclosure. The reader will understand that the aspects described and illustrated herein are non-limiting examples, and thus it can be appreciated that the specific structural and functional details disclosed herein may be representative and illustrative. Variations and changes thereto may be made without departing from the scope of the claims. Furthermore, it is to be understood that such terms as "forward", "rearward", "left", "right", "upwardly", "downwardly", and the like are words of convenience and are not to be construed as limiting terms.

In the present disclosure, like reference characters designate like or corresponding parts throughout the several views of the drawings.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present disclosure has been described with reference to various examples and illustrative aspects. The aspects described herein are understood as providing illustrative features of varying detail of various aspects of the disclosed invention; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the disclosed invention. Accordingly, it will be recognized by persons having ordinary skill in the art that various substitutions, modifications or combinations of any of the example aspects may be made without departing from the scope of the invention. In addition, persons skilled in the art will recognize, or be able to ascertain using no more than routine experimentation, many equivalents to the various aspects of the invention described herein upon review of the present disclosure. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the present disclosure are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In the present disclosure, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all subranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in the present disclosure is intended to include all lower numerical limitations subsumed therein, and any minimum numerical limitation recited in the present disclosure is intended to include all higher numerical limitations subsumed therein. Accordingly, Applicant reserves the right to amend the present disclosure, including the claims, to expressly recite any sub-range subsumed within the ranges expressly recited. All such ranges are inherently described in the present disclosure.

Any patent application, patent, non-patent publication, or other disclosure material referred to in the present disclosure and/or listed in any Application Data Sheet is incorporated by reference herein, to the extent that the incorporated materials is not inconstant herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A variable diameter fuel rod of a nuclear reactor assembly, the variable diameter fuel rod comprising:
   a sealed elongated cladding tube; and
   a plurality of fuel pellets positioned within the elongated cladding tube, wherein the plurality of fuel pellets comprise:
      a plurality of solid fuel pellets; and
      a plurality of annular fuel pellets, wherein an outside diameter of each of the plurality of solid fuel pellets and an outside diameter of each of the plurality of annular fuel pellets is the same, and wherein the sealed elongated cladding tube comprises:
         an axial region, wherein the plurality of solid fuel pellets are positioned in the axial region; and
         an axial reflector region positioned above the axial region, wherein the plurality of annular fuel pellets are positioned in the axial reflector region, wherein neutrons are reflected by the plurality of annular fuel pellets to the axial region, wherein the sealed elongated cladding tube defines a first inner cladding diameter $di_1$ along the entire axial region and a second inner cladding diameter $di_2$ at a top end of the axial reflector region, wherein the second inner cladding diameter $di_2$ is greater than the first inner cladding diameter $di_1$, and wherein the axial reflector region defines a sloped surface of the sealed elongated cladding tube between the first inner cladding diameter $di_1$ and the second inner cladding diameter $di_2$, wherein a first annular gap is defined between the outside diameter of a first annular fuel pellet of the plurality of annular fuel pellets and the sloped surface of the sealed elongated cladding tube, wherein a second annular gap is defined between the outside diameter of a second annular fuel pellet of the plurality of annular fuel pellets and the sloped surface of the sealed elongated cladding tube, wherein the first annular gap is positioned above the second annular gap, and wherein the first annular gap is larger than the second annular gap.

2. The variable diameter fuel rod of claim 1, wherein a thickness of the sealed elongated cladding tube is the same in the axial region and the axial reflector region.

3. The variable diameter fuel rod of claim 1, wherein the axial reflector region defines a void volume based on a difference in volume between an internal volume of the axial reflector region and a volume of the plurality of annular fuel pellets positioned in the axial reflector region.

4. The variable diameter fuel rod of claim 1, wherein the plurality of solid fuel pellets extend along the entire axial length of the axial region.

5. The variable diameter fuel rod of claim 4, wherein the plurality of annular fuel pellets extend along the entire axial length of the axial reflector region.

6. A variable diameter fuel rod of a nuclear reactor assembly, the variable diameter fuel rod comprising:
   a sealed elongate cladding tube, comprising:
      a top end;
      a bottom end;
      an axial reflector region adjacent the top end; and
      an axial region positioned below the axial reflector region;

a plurality of solid fuel pellets positioned in the axial region;

a plurality of annular fuel pellets positioned in the axial reflector region, wherein an outside diameter of each of the plurality of solid fuel pellets and an outside diameter of each of the plurality of annular fuel pellets is the same, wherein neutrons are reflected by the plurality of annular fuel pellets to the axial region, and wherein the plurality of annular fuel pellets comprise:

a first annular fuel pellet adjacent the top end of the sealed elongate cladding tube; and a second annular fuel pellet positioned below the first annular fuel pellet;

a first annular gap defined between the outside diameter of the first annular fuel pellet and a first inner cladding diameter defined by the sealed elongate cladding tube in the axial reflector region; and a second annular gap defined between the outside diameter of the second annular fuel pellet and a second inner cladding diameter defined by the sealed elongate cladding tube in the axial reflector region, wherein the first annular gap is larger than the second annular gap.

7. The variable diameter fuel rod of claim 6, wherein the first annular gap is positioned above the second annular gap.

8. The variable diameter fuel rod of claim 6, wherein a thickness of the sealed elongate cladding tube is the same in the axial region and the axial reflector region.

9. A variable diameter fuel rod of a nuclear reactor assembly, the variable diameter fuel rod comprising:

a sealed elongate cladding tube, comprising:
  a top end;
  a bottom end;
  an axial reflector region adjacent the top end; and
  an axial region positioned below the axial reflector region;

a first plurality of fuel pellets positioned in the axial region;

a second plurality of fuel pellets positioned in the axial reflector region, wherein neutrons are reflected by the second plurality of fuel pellets to the axial region, wherein the second plurality of fuel pellets are stacked on top of each other in a fuel pellet stack extending along the entire axial length of the axial reflector region, and wherein the fuel pellet stack defines an outside diameter;

a first annular gap defined between the outside diameter of the fuel pellet stack and a first inner cladding diameter defined by the sealed elongate cladding tube in the axial reflector region; and a second annular gap defined between the fuel pellet stack and a second inner cladding diameter defined by the sealed elongate cladding tube in the axial reflector region, wherein the first annular gap is larger than the second annular gap, and wherein the first annular gap is positioned above the second annular gap.

10. The variable diameter fuel rod of claim 9, wherein at least one of the second plurality of fuel pellets is an annular fuel pellet.

11. The variable diameter fuel rod of claim 9, wherein a thickness of the sealed elongate cladding tube is the same in the axial region and the axial reflector region.

* * * * *